(12) United States Patent
Zeng et al.

(10) Patent No.: US 12,550,049 B2
(45) Date of Patent: Feb. 10, 2026

(54) DEVICE NETWORK CONFIGURATION METHOD AND FIRST DEVICE

(71) Applicant: GUANGDONG OPPO MOBILE TELECOMMUNICATIONS CORP., LTD., Guangdong (CN)

(72) Inventors: Chunliang Zeng, Guangdong (CN); Zhaoxuan Zhai, Guangdong (CN); Zhigang Yu, Guangdong (CN); Taiyue Wu, Guangdong (CN); Zuo Fan, Guangdong (CN); Hongbo Zhu, Guangdong (CN); Fenghua Xu, Guangdong (CN); Yunfeng Cheng, Guangdong (CN); Zhenrong Yu, Guangdong (CN); Jinglin Wei, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 280 days.

(21) Appl. No.: 18/364,958

(22) Filed: Aug. 3, 2023

(65) Prior Publication Data
US 2023/0379799 A1 Nov. 23, 2023

Related U.S. Application Data

(63) Continuation of application No. PCT/CN2022/073386, filed on Jan. 24, 2022.

(30) Foreign Application Priority Data

Feb. 5, 2021 (CN) .......................... 202110164545.6

(51) Int. Cl.
*H04W 48/10* (2009.01)
*H04L 9/08* (2006.01)
(Continued)

(52) U.S. Cl.
CPC ......... *H04W 48/10* (2013.01); *H04L 41/0806* (2013.01); *H04W 12/03* (2021.01);
(Continued)

(58) Field of Classification Search
CPC ..... H04W 48/10; H04W 12/63; H04W 12/50; H04W 12/03; H04W 12/041;
(Continued)

(56) References Cited

U.S. PATENT DOCUMENTS 9,860,809 B2 * 1/2018 Mestanov ............. H04W 48/20
10,506,035 B2 * 12/2019 Kim .................... H04L 67/1046
(Continued)

FOREIGN PATENT DOCUMENTS

CN 104618988 A 5/2015
CN 105451231 A 3/2016
(Continued)

OTHER PUBLICATIONS

International Search Report and Written Opinion, International Application No. PCT/CN2022/073386, mailed Mar. 24, 2022 (15 pages).

(Continued)

*Primary Examiner* — Charles R Craver
(74) *Attorney, Agent, or Firm* — Ladas & Parry LLP

(57) ABSTRACT

A device network configuration method and a first device are provided. The method is performed by the first device. The first device interacts with a second device through n management frames, at least one of the n management frames includes a vendor specific field, and the n is a positive integer. The method includes: broadcasting a first management frame without disconnecting a current communication connection, a vendor specific field of the first management frame carrying networking information of a first network, the networking information of the first network being con-
(Continued)

figured to configure the second device to access the first network.

19 Claims, 7 Drawing Sheets

(51) Int. Cl.
| | | |
|---|---|---|
| H04L 41/0806 | (2022.01) | |
| H04W 12/03 | (2021.01) | |
| H04W 12/041 | (2021.01) | |
| H04W 12/50 | (2021.01) | |
| H04W 48/12 | (2009.01) | |
| H04W 48/18 | (2009.01) | |

(52) U.S. Cl.
CPC ......... *H04W 12/041* (2021.01); *H04W 12/50* (2021.01); *H04W 48/12* (2013.01); *H04W 48/18* (2013.01); *H04L 9/0844* (2013.01); *H04L 2209/80* (2013.01)

(58) Field of Classification Search
CPC ..... H04W 48/12; H04W 48/18; H04W 84/12; H04L 9/0844; H04L 41/0806; H04L 2209/80
See application file for complete search history.

(56) References Cited

U.S. PATENT DOCUMENTS

| | | | | |
|---|---|---|---|---|
| 11,729,701 | B2* | 8/2023 | Wu .................. | H04W 48/10 370/254 |
| 2004/0141464 | A1* | 7/2004 | Taylor .................. | H04L 43/00 370/248 |
| 2008/0126455 | A1* | 5/2008 | Francfort .............. | H04L 63/08 708/200 |
| 2011/0014868 | A1* | 1/2011 | Yun .................... | H04W 48/10 455/41.2 |
| 2012/0033568 | A1* | 2/2012 | Park ..................... | H04W 76/14 370/252 |
| 2014/0307707 | A1* | 10/2014 | Mestanov ......... | H04W 36/0066 370/331 |
| 2015/0085725 | A1 | 3/2015 | Estevez et al. | |
| 2015/0271745 | A1* | 9/2015 | Knowles ............... | H04W 48/16 370/254 |
| 2016/0073316 | A1* | 3/2016 | Calcev .............. | H04W 36/1446 370/332 |
| 2018/0302792 | A1 | 10/2018 | Zhang et al. | |
| 2019/0238435 | A1* | 8/2019 | Tao ....................... | H04W 48/14 |
| 2020/0034104 | A1* | 1/2020 | Honda .................. | H04N 9/3147 |
| 2020/0260279 | A1* | 8/2020 | He ....................... | H04W 12/06 |

FOREIGN PATENT DOCUMENTS

| | | |
|---|---|---|
| CN | 106131846 A | 11/2016 |
| CN | 106211264 A | 12/2016 |
| CN | 106535288 A | 3/2017 |
| CN | 106535316 A | 3/2017 |
| CN | 106571986 A | 4/2017 |
| CN | 106658665 A | 5/2017 |
| CN | 109246797 A | 1/2019 |
| CN | 109257793 A | 1/2019 |
| CN | 110519760 A | 11/2019 |
| CN | 106507346 B | 3/2020 |
| CN | 110995665 A | 4/2020 |
| CN | 111083765 A | 4/2020 |
| CN | 111315035 A | 6/2020 |
| CN | 112003714 A | 11/2020 |
| CN | 112020120 A | 12/2020 |
| WO | 2018064847 A1 | 4/2018 |
| WO | 2018076598 A1 | 5/2018 |
| WO | 2020133467 A1 | 7/2020 |
| WO | 2020238520 A1 | 12/2020 |

OTHER PUBLICATIONS

Chinese First Office Action, Chinese Application No. 202110164545.6, mailed Nov. 25, 2022 (29 pages).
Notification to Grant Patent Right for Invention, Chinese Application No. 202110164545.6, mailed Mar. 30, 2023 (6 pages).
European Search Report, European Patent Application No. 22748915.0, mailed Apr. 22, 2024 (8 pages).
Chinese First Office Action, Chinese Application No. 202310692285.9, mailed Jul. 5, 2025 (20 pages).
Second Office Action, Chinese Application No. 202310692285.9, mailed Nov. 29, 2025 (19 pages).

* cited by examiner

| Tag number | Length | OUI | Type | Data |

| Tag number | Length | OUI | Type 1 | Data | Tag number | Length | OUI | Type 1 | Other data | Tag number | Length | OUI | Type 2 | Data | Tag number | Length | OUI | Type 2 | Other data |

FIG. 5

| Tag number | length | OUI | Type is 0x00 | Vendor OUI | Data |

DEVICE NETWORK CONFIGURATION METHOD AND FIRST DEVICE

CROSS REFERENCE TO RELATED APPLICATIONS

The present disclosure is a continuation of International Patent Application No. PCT/CN2022/073386, filed Jan. 24, 2022, which claims priority to Chinese Patent Application No. 202110164545.6, filed Feb. 5, 2021, both of which are herein incorporated by reference in their entirety.

TECHNICAL FIELD

Embodiments of the present disclosure relate to the technical field of the Internet of Things, in particular to a device network configuration method and a first device.

BACKGROUND

Intelligent devices include devices, instruments, machines and the like with computing power and processing power. In general, when an intelligent device is used for the first time or a use scenario of the intelligent device is replaced for the first time (for example, a network environment of the intelligent device is replaced from one to another), it is necessary to configure a network for the intelligent device, such that the intelligent device can be connected to the network. In this way, the network can control the intelligent device.

Relevant arts provide a variety of methods for configuring networks for intelligent devices, including a network configuration manner based on access point (AP) connection. A main process of the network configuration manner based on AP connection is as follows. An intelligent device starts soft AP and broadcasts a beacon of the soft AP. After scanning the beacon of the soft AP, a network configuration device accesses the soft AP, such that the network configuration device and the intelligent device are in a same local area network (a network service provided by the soft AP started by the intelligent device). Through the network service provided by the soft AP started by the intelligent device, the network configuration device can send network configuration information of the AP to be accessed to the intelligent device, such as passwords of the AP to be accessed. Then the intelligent device closes the soft AP, and accesses the AP according to the network configuration information transmitted by the network configuration device to complete a network configuration process.

SUMMARY

According to an aspect of embodiments of the present disclosure, a device network configuration method performed by a first device is provided. The first device interacts with a second device through n management frames. At least one of the n management frames includes a vendor specific field, and the n is an integer greater than 0. The method includes: broadcasting a first management frame without disconnecting a current communication connection, a vendor specific field of the first management frame carrying networking information of a first network, the networking information of a first network being configured to configure the second device to access the first network.

According to an aspect of embodiments of the present disclosure, a device network configuration method performed by a second device is provided. The second device interacts with a first device through n management frames. At least one of the n management frames includes a vendor specific field, and the n is an integer greater than 0. The method includes: receiving a first management frame from the first device, a vendor specific field of the first management frame carrying networking information of the first network used to configure the second device to access the first network; and performing frame filtering on the first management frame.

According to an aspect of embodiments of the present disclosure, a first device is provided. The first device interacts with the second device through n management frames. At least one of the n management frames includes a vendor specific field, and the n is an integer greater than 0. The first device includes a processor and a transceiver connected to the processor. The transceiver is configured to broadcast a first management frame without disconnecting a current communication connection, and a vendor specific field of the first management frame carries networking information of the first network used to configure the second device to access the first network.

BRIEF DESCRIPTION OF THE DRAWINGS

In order to make the technical solution described in embodiments of the present disclosure more clearly, the drawings used for description of embodiments will be described. For those skilled in the art, other drawings may be acquired according to the drawings without any creative work.

FIG. 5 is a schematic diagram of a format of a layer-2 message according to another embodiment of the present disclosure.

DETAILED DESCRIPTION

In order to make the purpose, the technical solutions and the technical effect of the present disclosure clear, embodiments of the present disclosure will be further described in detail below in combination with the drawings.

The system architecture and service scenarios described in embodiments of the present disclosure are intended to more clearly describe the technical solutions of the embodiments of the present disclosure, and do not constitute limitation of the technical solutions provided by the embodiments of the present disclosure. Those skilled in the art know should understand that, with evolution of the network architecture and emergence of new service scenarios, the technical solutions provided by the embodiments of the present disclosure is also applicable to similar technical problems.

Figure 1:
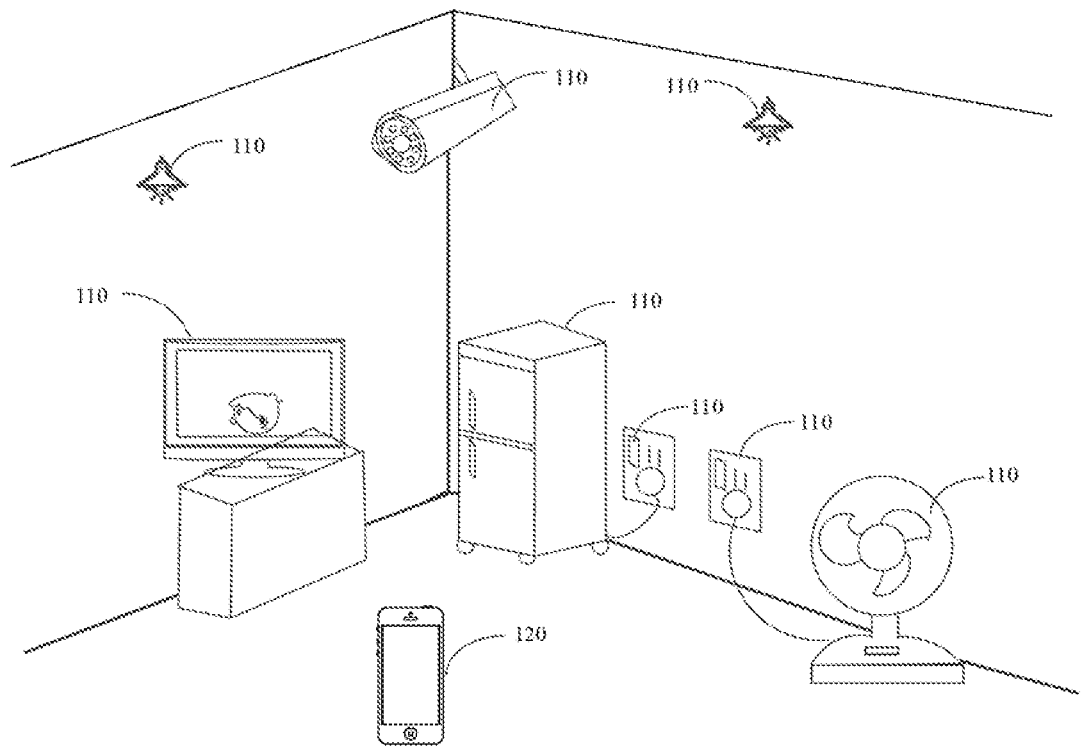
FIG. 1 is a schematic diagram of a network configuration system according to an embodiment of the present disclosure.

As illustrated in FIG. 1, FIG. 1 is a schematic diagram of a network configuration system according to an embodiment of the present disclosure. The network configuration system may include a second device 110 and a first device 120.

The second device 110 is a device with a capability of accessing a network, for example, the second device 110 is a device with capability of accessing a wireless fidelity (WiFi). In some embodiments, the second device 110 is an intelligent device (such as a virtual reality (VR) glass, an intelligent wearable device, or an intelligent robot, etc.), or other terminal devices with the capability of accessing a network, which is not limited. In some embodiments, as illustrated in FIG. 1, when the network configuration system is applied to intelligent home life, the second device 110 may be an intelligent device, such as an intelligent TV, an intelligent speaker, an intelligent air conditioner, an intelligent light, an intelligent door window, an intelligent curtain, an intelligent socket, or so on. In some embodiments, the number of the second device 110 may be one or more, which is not limited. In practical applications, the number of the second device 110 may be determined in combination with application requirements or maximum number of devices that the first device 120 can manage.

The first device 120 is a device with a capability of configuring an access network, also called a network configuration device. In some embodiments, the first device 120 may be a server, a terminal device, a router, a mobile phone, a tablet computer, a wearable device, or other devices with the ability of configuring an access network, which is not limited. In practical applications, an implementation form of the first device 120 may be determined in combination with application scene of the network configuration system. In some embodiments, as illustrated in FIG. 1, since a home environment has small area and frequent activities, the first device 120 occupying a large space may affect normal home life. When the network configuration system is applied to the intelligent home life, the first device 120 may be a router, a terminal device, a mobile phone, a tablet computer, or a wearable device, etc. In some embodiments, for a certain network configuration system, the number of the first device corresponding to the network configuration system may be one or more, which is not limited. Generally, for a purpose of saving resources and other aspects, the number of a first device corresponding to a certain network configuration system is one. In some embodiments, first devices corresponding to different network configuration systems are different, so that a second device 110 corresponding to a network configuration system is bound to a first device 120 corresponding to the network configuration system. For example, when the network configuration system is applied to an intelligent home life and a family is taken as a unit, the second device in the family is bound to the first device in the family.

In some embodiments of the present disclosure, the first device 120 may configure the second device 110 to access a network provided by the AP, that is, the first device 120 may configure the second device 110 to access the network. Relevant arts provide a plurality of methods to configure the second device to access the network, including a network configuration method based on the AP connection. The network configuration method based on the AP connection is described below.

Figure 2:
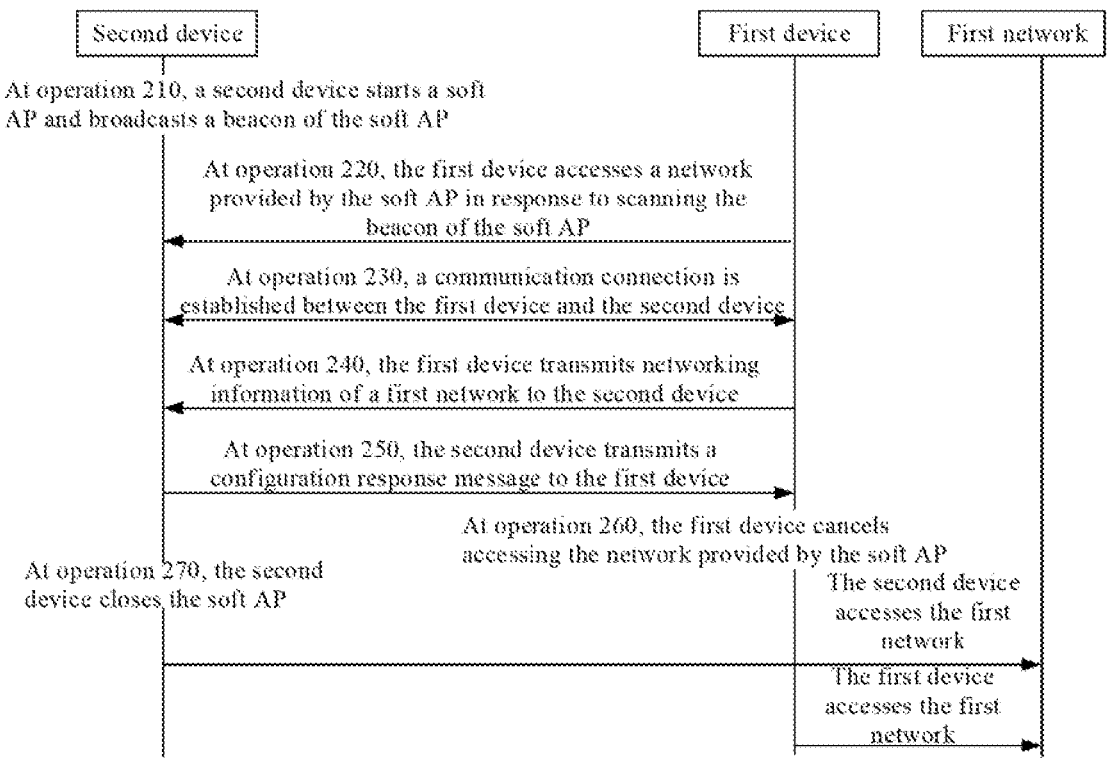
FIG. 2 is a flowchart of a network configuration method based on AP connection according to an embodiment of the present disclosure.

As illustrated in FIG. 2, FIG. 2 is a flowchart of a network configuration method based on AP connection according to an embodiment of the present disclosure. As illustrated in FIG. 2, the network configuration method based on the AP connection may include following operations (operations 210-270).

At operation 210, a second device starts a soft AP and broadcasts a beacon of the soft AP.

In some embodiments of the present disclosure, the second device may start the soft AP when entering a network configuration mode. After the second device starts the soft AP, it may broadcast the beacon of the soft AP. In some embodiments, the beacon of the soft AP includes at least one of a device identifier (ID) of the second device, a user-defined network name, and a protocol name of an application protocol, etc. The device ID may be a media access control address (MAC) of the second device. In some embodiments, the beacon of the soft AP includes at least one of following fields: a basic service set identifier (BSSID) field, a service set identifier (SSID) field, and a vendor specific field.

At operation 220, the first device accesses a network provided by the soft AP in response to scanning the beacon of the soft AP.

The first device may scan beacons broadcast by other devices on different channels. When the first device scans the beacon of the soft AP on the channel where the second device broadcasts the beacon of the soft AP, it may access the network provided by the soft AP. In some embodiments, after scanning the beacon of the soft AP, the first device determines whether the SSID field in the beacon conforms to a preset format, and accesses the network provided by the soft AP when the SSID field conforms to the preset format.

At operation 230, a communication connection is established between the first device and the second device.

After accessing the network provided by the soft AP, the first device may establish the communication connection with the second device through the soft AP. In some embodiments, the communication between the first device and the second device meets a transmission control protocol (TCP) protocol, so that the communication connection between the first device and the second device may also be called a TCP connection. In some embodiments, the communication between the first device and the second device meets a vendor datagram protocol (UDP) protocol, so that the communication connection between the first device and the second device may also be called a UDP connection.

At operation 240, the first device transmits networking information of a first network to the second device.

After the first device accesses the network provided by the soft AP started by the second device and acquires information related APs that the second device is capable of accessing (i.e., accessible AP information), it may select a network provided by the AP that second device is capable of accessing, namely the first network, according to the accessible AP information. In some embodiments, the accessible AP information includes at least one of a SSID field of the accessible AP and a signal strength of the accessible AP. In some embodiments of the present disclosure, after entering the network configuration mode, the second device may scan the beacon of the AP at a certain interval (such as 10 seconds), and determine whether it may access the network provided by the AP according to the SSID field in the beacon.

Some embodiments of the present disclosure do not limit a manner the first device selects the first network. In some embodiments, the first device determines a network provided by the AP with a highest signal strength and indicated by the accessible AP information as the first network. After the first device selects the first network, it may transmit networking information of the first network to the second device to configure the second device to access the first network. In some embodiments, the networking information of the first network includes at least one of a SSID field of the first network, and passwords of the first network.

At operation 250, the second device transmits a configuration response message to the first device.

The configuration response message is used to respond to the networking information of the first network transmitted by the first device to indicate to the first device whether the second device has received the networking information of the first network. In some embodiments, after the first device transmits the networking information of the first network to the second device, it defaults that the second device has received the networking information of the first network. When the second device successfully receives the networking information of the first network, it may not transmit the configuration response message to the first device. When the second device does not successfully receive the networking information of the first network, for example, the second device cannot parse the networking information of the first network, it may transmit the configuration response message to the first device.

At operation 260, the first device cancels accessing the network provided by the soft AP.

After the first device transmits the networking information of the first network to the second device, it may disconnect the connection with the soft AP started by the second device, that is, the first device cancels accessing the network provided by the soft AP. In some embodiments, the first device cancels accessing the network provided by the soft AP after transmitting the networking information of the first network. In some embodiments, after receiving the configuration response message, the first device cancels accessing the network provided by the soft AP. The embodiment of the present disclosure does not limit a time of the first device canceling accessing the network provided by the soft AP.

At operation 270, the second device closes the soft AP.

Since the second device usually cannot access networks provided by two APs at the same time, the second device needs to close the soft AP to access the first network. In some embodiments, the second device closes the soft AP after receiving the networking information of the first network. In some embodiments, after the second device transmits the configuration response message to the first device, it closes the soft AP. In some embodiments, the second device closes the soft AP after the first device cancels accessing the network provided by the soft AP. The embodiment of the present disclosure does not limit the time the second device closing the soft AP.

After the second device closes the soft AP, it may access the first network according to the passwords in the networking information of the first network. After the first device cancels accessing the network provided by the soft AP, it may also access the first network to continue to control and manage the second device. In this way, the first device and the second device establish a communication connection through the first network.

Taking the first device being the network configuration device and the second device being the intelligent device as an example, it may be seen from the above embodiments in FIG. 2 that the network configuration device needs to disconnect the network currently connected to the network configuration device and access the network provided by the soft AP started by the intelligent device in the process of the network configuration device configuring network for the intelligent device, the network configuration device may further transmit the networking information of the first network to the intelligent device to configure the intelligent device to access the first network, such as configuring the intelligent device to access a home WiFi network. However, above way may cause the network configuration device to disconnect the current communication connection in the process of the network configuration device configuring network for the intelligent device, which may adversely affect normal communication of the network configuration device. In addition, since the network configuration device needs to access the network provided by the soft AP started by the intelligent device, the intelligent device has to broadcast the beacon of the soft AP started by the intelligent device, which has higher requirements for a device capability of the intelligent device.

Therefore, some embodiments of the present disclosure provide a device network configuration method, which may solve the above technical problems. It should be understood that the first device described in some embodiments of the present disclosure may also be called a network configuration device, and the second device may also be called an intelligent device. In following, technical solutions in the present disclosure are introduced and explained in combination with some embodiments.

Before introducing the technical solutions provided by some embodiments of the present disclosure, an information interaction manner between the first device and the second device in some embodiments of the present disclosure is introduced.

The first device interacts with the second device through n management frames, and n is an integer greater than 0. The management frame is configured to monitor a network, and its main application scene include: network connection, network disconnection, and transference between networks provided by different APs. In combination with different application scenes and operations performed by different execution objects in different application scenes, management frames may be classified into different types. In some embodiments, types of the n management frames include at least one of a beacon frame, a probe frame, and an action frame.

Figures 3, 4:
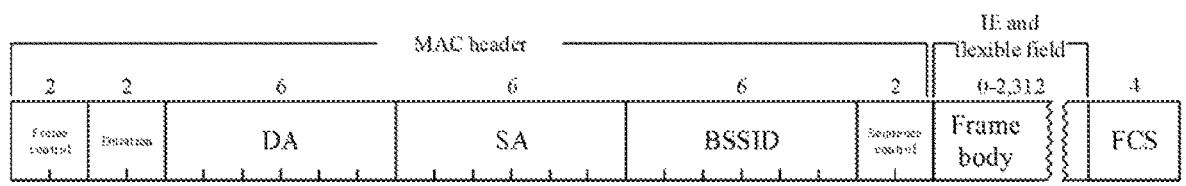
FIG. 3 is a schematic diagram of a format of a detection management frame according to some embodiments of the present disclosure.
FIG. 4 is a schematic diagram of a format of a layer-2 message according to an embodiment of the present disclosure.

In some embodiments of the present disclosure, at least one of the n management frames includes a vendor specific field. In some embodiments, a type of at least one management frame includes at least one of a detection frame and an action frame. As illustrated in FIG. 3, FIG. 3 is a schematic diagram of a format of a management frame according to an embodiment of the present disclosure. Combined with FIG. 3, in some embodiments, the management frame includes at least one of following fields: a frame control field, a duration field, a destination address (DA) field, a source address (SA) field, a BSSID field, a sequence control field, a frame body field, and a frame check sequence (FCS) field. In some embodiments, the frame body field includes at least one of following fields: a SSID field, a supported rate field, an extended supported rate field, and a vendor specific field. Description of each field in the management frame illustrated in FIG. 3 is shown in Table 1 below.

TABLE 1

Format description of detection management frame

| S/N | Data Definition | Description |
|---|---|---|
| 1 | Frame control field | Information related to control a MAC frame |
| 2 | Duration field | Calculation of frame duration |
| 3 | DA field | Destination address of the MAC frame |
| 4 | SA Field | Source address of the MAC frame |
| 5 | BSSID field | Filter a received MAC frames |
| 6 | Sequence control field | Recombination of frame fragments and discarding duplicate frames |
| 7 | SSID field | SSID |
| 8 | Support rate field | Support rate |
| 9 | Extended Support Rate Field | Extended support rate |
| 10 | Vendor specific field | Information elements defined by a vendor |
| 11 | FCS field | Verifying whether a transmitted frame is correct |

For the above vendor specific field, in some embodiments, the vendor specific field may carry a layer-2 message. In some embodiments, the vendor specific field includes at least one information element (IE). As illustrated in FIG. 4, FIG. 4 is a schematic diagram that a vendor specific field including one IE according to some embodiments of the present disclosure. As illustrated in FIG. 5, FIG. 5 is a schematic diagram that a vendor specific field including a plurality of IEs according to some embodiments of the present disclosure. In some embodiments, when one IE cannot carry all data of the layer-2 message carried by the vendor specific field, a plurality of IEs are supported, and subsequent IEs continue to carry, behind a tag number, remaining data, such that the data of all IEs with same tag number are sequentially spliced together as complete data for parsing.

Based on schematic diagrams of formats of the vendor specific field illustrated in FIG. 4 and FIG. 5, in some embodiments, a first IE in at least one IE includes at least one of following sub-fields: a tag number sub-field, a length sub-field, an organizationally unique identifier (OUI) field, a type sub-field, and a data sub-field. The tag number sub-field is used to identify the vendor specific field and carries the tag number defined by a manufacturer, for example, the tag number is 221. The length sub-field is used to identify a length of the first IE. The OUT field is used to identify a format standard corresponding to the first IE, for example, a value of the OUT field is 0xFCA5D0. The type sub-field is used to identify a type of the layer-2 message. In some embodiments, a definition of the type sub-field is shown in Table 2 below. The data sub-field is used to describe content information of the layer-2 message.

TABLE 2

Definition of type sub-fields

| Type sub-field | Definition |
|---|---|
| 0x00 | Transparent transmission of vendor specific data |
| 0x01 | Device discovery request |
| 0x02 | Device discovery response |
| 0x03 | Device network configuration request |
| 0x04 | Device network configuration response |
| 0x05 | Device synchronization password request |
| 0x06 | Device synchronization password response |

Based on the definition of the type sub-field shown in Table 2, when the type is 0x00, the data of the IE is the vendor specific data. At this case, the vendor organization unique identifier (Vendor OUI) is added to identify the vendor. Based on this, the format of the vendor specific field is illustrated in FIG. 6.

Figures 6, 7:
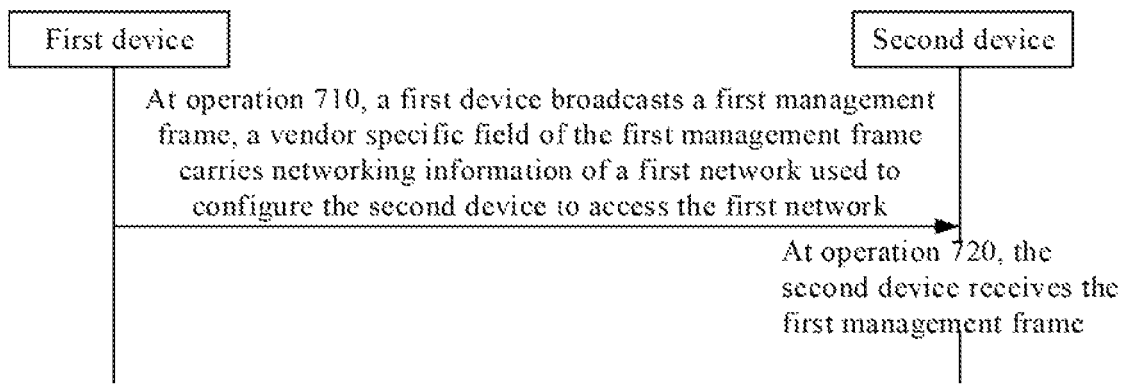
FIG. 6 is a schematic diagram of a format of a layer-2 message according to still another embodiment of the present disclosure.
FIG. 7 is a flowchart of a device network configuration method according to an embodiment of the present disclosure.

As illustrated in FIG. 7, FIG. 7 is a flowchart of a device network configuration method according to an embodiment of the present disclosure. The method may be applied in the network configuration system illustrated in FIG. 1. The method may include following operations.

At operation 710, a first device broadcasts a first management frame, a vendor specific field of the first management frame carries networking information of a first network used to configure the second device to access the first network.

The first management frame is a management frame broadcast by the first device when the first device configures the second device to access the first network. The first management frame includes a vendor specific field. Description of the vendor specific field is described in the above embodiments, which is not repeated. In some embodiments, a type of the first management frame may include an action frame or a probe frame. In some embodiments, in order to ensure that the second device may monitor to the first management frame broadcast by the first device, the first device broadcasts the first management frame on an operating channel of the second device. In some embodiments, in order to avoid that the second device cannot receive the first management frame due to packet loss and other factors, the first device broadcasts the first management frame N times, and N is an integer greater than 1. For example, when N is 3, and the first device broadcasts the first management frame 3 times.

In order to ensure that the second device may correctly parse the first management frame, in some embodiments of the present disclosure, the first device broadcasts the first management frame on the operating channel of the second device when the second device supports the layer-2 network configuration. Based on this, in some embodiments, before the above operation 710, the method may also include: the second device transmitting device information of the second device to the first device. The device information of the second device includes at least one of the operating channel of the second device, product identification information of the second device, the capability information of the second device, and a random number. The capability information of the second device includes that the second device supports the layer-2 network configuration, and the random number is used to generate a shared key to encrypt the networking information of the first network.

In some embodiments of the present disclosure, the vendor specific field of the first management frame carries the networking information of the first network, the networking information is used to configure the second device to access the first network. It may be seen from the above description that the first device may acquire a random number from the second device before broadcasting the first management frame, that is, in a device discovery stage. The random number is used to generate the shared key to encrypt the networking information of the first network. Based on this, in some embodiments, the networking information of the first network included in the first management frame is encrypted networking information. In some embodiments, the layer-2 message carried by the first management frame includes a device network configuration request. A value of the type sub-field corresponding to the device network configuration request is a first value (such as 0x03 mentioned above). A data sub-field corresponding to the device network configuration request carries the networking information of the first network.

At operation 720, the second device receives the first management frame.

The second device may receive the first management frame broadcast by the first device. In some embodiments, the above operation 720 includes: the second device monitoring the first management frame on the operating channel of the second device. After entering the network configuration mode, the second device may monitor messages broadcast by other devices on its operating channel. In some embodiments of the present disclosure, the second device monitors the first management frame broadcast by the first device on its operating channel. The second device monitoring the first management frame means that the second device receives the first management frame, and then the second device may access the first network according to the networking information of the first network carried by the first management frame.

In some embodiments of the present disclosure, the first network is a network selected by the user from at least one network provided by the first device. Based on this, in some embodiments, the above method may also include: the first device displaying options corresponding to at least one network, the at least one network including the first network; acquiring the networking information of the first network in response to a selection operation of the options corresponding to the first network; encrypting the networking information of the first network through the shared key to acquire an encrypted networking information.

A client with network configuration function may be installed and run in the first device, such that the first device may display options corresponding to the at least one network in a user interface of the client. In some embodiments, at least one network meets a fourth condition, which includes: an operating frequency band being a first frequency band, and/or a channel strength being greater than a second strength threshold. In some embodiments, the first frequency band includes 2.4 GHz (megahertz), and the second strength threshold includes −70 dbm (decibel relative to one milliwatt), such that the at least one network is a network whose operating frequency band includes 2.4 GHz and/or channel strength is greater than −70 dbm. In some embodiments of the present disclosure, the at least one network includes the first network. In some embodiments, the first network is a network accessed by the first device. In this way, a display sequence of the at least one network includes: displaying the first network first, that is, displaying a network accessed by the first device first.

When the user selects the first network, the client with the network configuration function transmits an information acquisition request to a bottom layer of the first device in response to the user's selection operation for the options corresponding to the first network, so as to request to acquire the networking information of the first network. Since the first network is the network accessed by the first device, the bottom layer of the first device may directly acquire the networking information of the first network based on current connection of the first device, such that there is no need for the user to input networking information, and a manual input operation of the user is released.

After the first device acquires the networking information of the first network, it may encrypt the networking information of the first network, acquire the encrypted networking information, and carry the encrypted networking information in the first management frame. In some embodiments, the networking information of the first network includes passwords of the first network and a SSID. In some embodiments, the shared key configured to encrypt the networking information of the first network may be acquired after the random number is processed by elliptic curve Diffie-Hellman key exchange (ECDH), and the random number is a random number transmitted by the second device to the first device in the device discovery stage. In some embodiments, advanced encryption standard (AES) 128-CCM algorithm may be used to encrypt when the first device uses the encryption key to encrypt the networking information of the first network.

Based on this, in some embodiments, the above method may also include: the second device decrypting the encrypted networking information through the shared key to acquire the networking information of the first network; the second device accessing the first network based on the networking information of the first network.

In order to ensure that the second device may parse the networking information of the first network, when the second device calculates the shared key through the ECDH, the second device also calculates the shared key through the ECDH, and decrypts the encrypted networking information through the shared key. In some embodiments of the present disclosure, the second device processes the random number through the ECDH to acquire the shared key, and the random number is a random number stored locally by the second device. When the shared keys calculated by the first device and the second device are same, the second device may parse the networking information of the first network, and then access the first network based on the networking information of the first network. In some embodiments of the present disclosure, an encrypted transmission of the networking information of the first network avoids disclosure of networking information and improves security of the first network.

In order to further ensure the security of the first network, in some embodiments of the present disclosure, message verification is added before the second device accesses the first network. Only when the message verification is passed, may the second device further access the first network. Based on this, in some embodiments, the first management frame also carries a random number used by the second device for the message verification, and the random number is transmitted by the second device to the first device during a device discovery process. In some embodiments, the first management frame may also include a SSID field, and the random number is carried in the SSID field. In some embodiments, the random number is carried in the vendor specific field of the first management frame, and the embodiments of the present disclosure do not limit the field carrying the random number. When the second device monitors and receives the first management frame, it may parse the random number from the first management frame, and compare the random number with the locally stored random number. When the two random numbers are same, the message verification is passed. By frames filtering according to the random number carried in the first management frame before the second device accesses the first network, the first management frame monitored by the second device is ensured to be configured for the second device to access the network, rather than for other devices to access the network, so as to prevent the second device from accessing other networks by mistake and improve the security of the network configuration system.

To sum up, the technical solutions provided by the embodiment of the present disclosure implements rapid interaction of information related to network configuration between the network configuration device and the intelligent device by the network configuration device broadcasting the information related to network configuration to the intelligent device. In some embodiments of the present disclosure, the network configuration device may broadcast the information related to the network configuration to the intelligent device without disconnecting the current communication connection, such that the stability of the current communication connection of the network configuration device is ensured. Moreover, in some embodiments of the present disclosure, the intelligent device only needs to monitor to acquire the information related to the network configuration without starting hotspot connection, such that there is no high requirement for the device capability of the intelligent device, thereby reducing the cost of the intelligent device.

In addition, in the technical solutions provided by the embodiment of the present disclosure, the network configuration device filters networks according to certain conditions, and displays the network available for access the user for selection. When the user selects the network currently accessed by the network configuration device, the network information such as the access passwords of the network is directly acquired by the network configuration device based on the current connection through a modification of a system bottom layer, rather than manual input, which releases the manual input operation of the user and brings the user a smooth network configuration experience.

In some embodiments, the above method may also include following operations.

At operation 730, the first device broadcasts a third management frame on a channel corresponding to the first network, and a vendor specific field of the third management frame carries network-configuration-progress-query information for the second device.

In order to enable the first device to know the network configuration progress in time and feed back to the user after broadcasting the first management frame carrying the networking information of the first network to the second device, in some embodiments of the present disclosure, the first device broadcasts the third management frame on the channel corresponding to the first network after broadcasting the first management frame. The second device switches an original operating channel to the channel corresponding to the first network in a process of accessing the first network, such that when the first device queries the network configuration progress, it broadcasts the third management frame on the channel corresponding to the first network.

In some embodiments of the present disclosure, the third management frame is a management frame transmitted by the first device when the first device queries the network configuration progress for the second device. Therefore, the vendor specific field of the third management frame carries the network-configuration-progress-query information, which is used to request to query the network configuration progress for the second device. In some embodiments, a type of the third management frame may include an action frame or a detection frame. In some embodiments, a layer-2 message carried by the third management frame includes a device network configuration request. A value of the type sub-field corresponding to the device network configuration request is a first value (such as 0x03 mentioned above). A data sub-field corresponding to the device network configuration request carries the network-configuration-progress-query information.

In order to provide sufficient time for the second device to scan the first management frame and perform processing such as parsing the first management frame, in some embodiments, the above operation 730 may include: the first device broadcasting the third management frame on the channel corresponding to the first network at a first interval from a broadcasting time of the first management frame. In some embodiments, the first interval is 5 seconds. Since the network configuration progress changes frequently, in order to enable the user to know changes of the network configuration progress in time, the first device may broadcast the third management frame on the channel corresponding to the first network, the above operation 730 may include: the first device continuously broadcasting the third management frame on the channel corresponding to the first network at a third interval. In some embodiments, the third interval is 1 second.

In some embodiments of the present disclosure, the first device may also broadcast the third management frame in combination with the above two manners, that is, from the broadcast time of the first management frame, after the first interval, the first device may broadcast the third management frame continuously on the channel corresponding to the first network at the third interval taken as the broadcast interval. If the first device also continuously transmits the third management frame when the network configuration succeeds or the network configuration times out, a processing overhead of the first device will be wasted. Therefore, in order to reduce the processing overhead of the first device, in some embodiments, the first device stops broadcasting the third management frame when the network configuration progress for the second device meets a fifth condition. In some embodiments, the fifth condition includes: the network configuration being successful, and/or the network configuration interval exceeds the third interval.

At operation 740, the second device transmits a second management frame to the first device, and a vendor specific field of the second management frame carries the network-configuration-progress information of the second device.

After the second device parses the networking information of the first network from the first management frame, it accesses the first network based on the networking information, and then may switch from its original operating channel to the channel corresponding to the first network. After that, the second device monitors messages broadcast by other devices on the channel corresponding to the first network. In some embodiments of the present disclosure, the second device monitors the third management frame broadcast by the first device on the channel corresponding to the first network.

The second device monitoring the third management frame means that the second device has received the third management frame, and then the second device may parse the network-configuration-progress-query information from the third management frame to determine that the first device requests to acquire the network configuration progress for the second device. In response to the network-configuration-progress-query information, the second device may transmit the second management frame to the first device. The vendor specific field of the second management frame carries the network-configuration-progress information used to indicate the network configuration progress for the second device. In some embodiments, a type of the second management frame may include an action frame or a detection frame. In some embodiments, a layer-2 message carried by the second management frame includes a device network configuration response. A value of the type sub-field corresponding to the device network configuration response is a second value (such as 0x04 mentioned above). A data sub-field corresponding to the device network configuration response carries the network-configuration-progress information. In some embodiments, the above operation 740 includes: the second device transmitting the second management frame to the first device in response to the network configuration progress for the second device meeting a first condition. The first condition includes any of following: within a second interval in a process of a network configuration, within the second interval after the network configuration is successful, and within the second interval after the network configuration is failed. The second interval is 5 seconds.

In some embodiments of the present disclosure, when the second device does not scan the first management frame, or the second device does not parse the networking information of the first network, etc., which causes the second device not to access the first network. In this case, the second device still monitors messages broadcast by other devices on its original operating channel, such that the second device cannot monitor the third management frame broadcast by the first device. Based on this, in order to enable the first device to know an abnormal situation of the second device in time, and to deal with the abnormal situation, in some embodiments, the above method may also include: in response to the first device detecting a second network, it broadcasting the first management frame on the operating channel of the second device again. The second network is a network started by the second device (such as the network provided by the soft AP mentioned above).

To sum up, in the technical solutions provided by the embodiment of the present disclosure, when configuring the intelligent device to access a network, the network configuration device broadcasts the management frame carrying the network-configuration-progress-query information to the intelligent device on a channel corresponding the network, so as to request to query the network configuration progress for the intelligent device, such that the network configuration progress for the intelligent device may be acquired in time. In addition, the network configuration device may also detect a network started by the intelligent device to know the abnormal situation in the network configuration process in time, and deal with the abnormal situation in time, thereby effectively improving a success rate of the network configuration for the network configuration device.

In some embodiments, after operation 720, the method may include any one of following operations.

At operation 752, the second device acquires a signal strength corresponding to the first device. In response to the signal strength meeting a second condition, the second device accesses the first network based on the networking information of the first network.

Considering factors such as the processing overhead and the device capability of the second device, the second device may directly determine whether the second device may access the first network based on the signal strength corresponding to the first device. In some embodiments of the present disclosure, the second device accesses the first network in response to the signal strength corresponding to the first device meeting the second condition. The second device terminates the network configuration in response to the signal strength corresponding to the first device doing not meet the second condition. In some embodiments, the second condition includes: the signal strength corresponding to the first device being greater than a first strength threshold, for example, the first strength threshold is −40 dbm.

At operation 754, the second device acquires the signal strength corresponding to the first device, and determines a distance between the first device and the second device based on the signal strength. In response to the distance meeting a third condition, the second device access the first network based on the networking information of the first network.

The second device acquires the signal strength corresponding to the first device through a signal strength calculation, and further determines the distance between the first device and the second device based on the signal strength corresponding to the first device, so as to determine, based on the distance, whether the second device may access the first network. The distance between the first device and the second device may intuitively reflect whether the second device is located in the network configuration system where the first network is located. In some embodiments of the present disclosure, in response to the distance between the first device and the second device meeting the third condition, the second device accesses the first network. In response to the distance between the first device and the second device doing not meet the third condition, the second device terminates the network configuration. In some embodiments, the third condition includes: the distance between the first device and the second device being less than the first distance threshold, for example, the first distance threshold is 5 meters.

At operation 756, the second device acquires the distance between the first device and the second device. In response to the distance meeting the third condition, the second device accesses the first network based on the networking information of the first network.

In some embodiments of the present disclosure, in addition to calculating the distance between the first device and the second device through the signal strength corresponding to the first device, the second device may also acquire the distance between the first device and the second device based on other manners, which is not limited in some embodiments of the present disclosure. For example, in the device discovery process, the first device acquires a signal strength corresponding to the second device, and calculates the distance between the first device and the second device based on the signal strength corresponding to the second device. Later, the first device carries the distance between the first device and the second device in the first management frame. In this way, the second device may directly acquire the distance between the first device and the second device without calculating the distance.

To sum up, in the technical solutions provided by the embodiment of the present disclosure, before accessing the network, the intelligent device acquires the signal strength of the network configuration device, and determines whether the network may be accessed by the intelligent device based on the signal strength or the distance determined based on the signal strength, so as to ensure that the network accessed by the intelligent device is a network matching the intelligent device, rather than a network in other network configuration systems, thereby improving the security of the network configuration system.

Following describes the technical solutions provided by some embodiments of the present disclosure.

Figure 8:
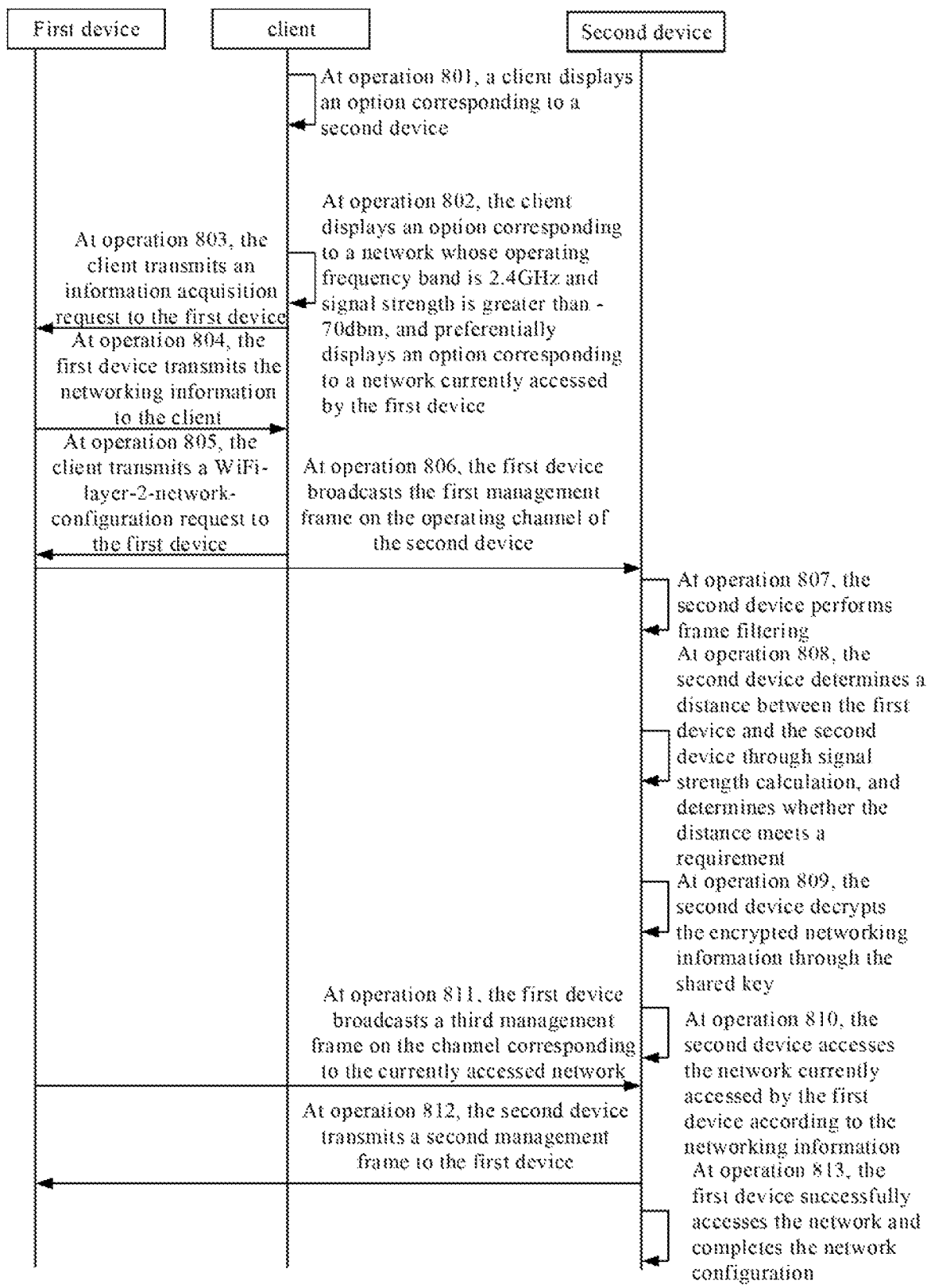
FIG. 8 is a flowchart of a device network configuration method according to another embodiment of the present disclosure.

As illustrated in FIG. 8, FIG. 8 is a flowchart of a device network configuration method according to an embodiment of the present disclosure. The method may be applied in the network configuration system illustrated in FIG. 1. The method may include following operations.

At operation 801, a client displays an option corresponding to a second device. The client is a client with network configuration capability in a first device. An application interface of the client may display the option corresponding to the second device. When the user needs to configure the second device to access a network, the option corresponding to the second device displayed in a user interface may be touched.

At operation 802, the client displays an option corresponding to a network whose operating frequency band is 2.4 GHz and signal strength is greater than −70 dbm, and preferentially displays an option corresponding to a network currently accessed by the first device. In response to the user's selection instruction for the option corresponding to the second device, the client displays options corresponding to filtered networks in the user interface for the user to select, and the client preferentially displays the option corresponding to the network currently accessed by the first device to guide the user to select the option.

At operation 803, the client transmits an information acquisition request to the first device. When the user touches the option corresponding to the network currently accessed by the first device, the client transmits the information acquisition request to a bottom layer of the first device to request to acquire networking information of the network currently accessed by the first device. In some embodiments, the networking information includes network passwords and a SSID.

At operation 804, the first device transmits the networking information to the client. The bottom layer of the first device may directly acquire the networking information of the currently accessed network based on current communication connection and transmit the networking information to the client without the user putting in the user interface of the client, thereby releasing the user's manual input operation.

At operation 805, the client transmits a WiFi-layer-2-network-configuration request to the first device. In a process of discovering the second device, the client may acquire information related to the second device, such as the operating channel of the second device, and whether the second device supports the layer-2 network configuration, etc. In this way, when the second device supports the layer-2 network configuration, the client may transmit the WiFi-layer-2-network-configuration request to the bottom layer of the first device to request to configure the second device to access the network currently accessed by the first device. In some embodiments, the WiFi-layer-2-network-configuration request carries the network configuration information such as the operating channel of the second device, etc.

At operation 806, the first device broadcasts the first management frame on the operating channel of the second device. The first management frame includes a vendor specific field carrying the networking information of the network accessed by the second device. In some embodiments, the networking information of the network is information encrypted by a shared key, the shared key is calculated by a random number acquired in the device discovery process. The first management frame may also include the random number used by the second device for message verification.

At operation 807, the second device performs frame filtering. On the one hand, the second device acquires the random number transmitted by the first device, and on the other hand, the second device stores the random number locally. After that, the second device may perform frame filtering based on these two random numbers, that is, the message verification. When the two random numbers match, following operation 808 is performed. When the two random numbers do not match, the second device continues to monitor the first management frame on the operating channel of the second device.

At operation 808, the second device determines a distance between the first device and the second device through signal strength calculation, and determines whether the distance meets a requirement. When the distance between the first device and the second device is less than a preset distance threshold, it is determined that the requirement is met, and following operation 809 is performed. When the distance between the first device and the second device is greater than the preset distance threshold, it is determined that the requirement is not met, and the second device terminates the network configuration process.

At operation 809, the second device decrypts the encrypted networking information through the shared key. The second device may acquire the shared key by calculating the locally stored random number, and further decrypt the encrypted networking information through the shared key to acquire the networking information of the network currently accessed by the first device.

At operation 810, the second device accesses the network currently accessed by the first device according to the networking information.

At operation 811, the first device broadcasts a third management frame on the channel corresponding to the currently accessed network. Five seconds after the first management frame is broadcast, the first device may broadcast the third management frame on the channel corresponding to the currently accessed network every one second. The third management frame includes a vendor specific field, and the vendor specific field carries a network-configuration-progress-query information to request to query the network configuration progress for the second device. During this period, in response to the first device detecting that a hotspot started by the second device still exists, the first device broadcasts the first management frame to the second device again on the operating channel of the second device.

At operation 812, the second device transmits a second management frame to the first device. The second management frame is used to respond to the third management frame. The second management frame includes a vendor specific field carrying network-configuration-progress information to indicate the network configuration progress to the first device. In some embodiments, the second device needs to respond to the third management frame when the second device is in any of following network configuration states, within 5 seconds in a process of a network configuration, within 5 seconds after the network configuration is successful, and within 5 seconds after the network configuration is failed.

At operation 813, the first device successfully accesses the network and completes the network configuration.

In addition, some embodiments of the present disclosure also provide a specific broadcast design of the management frame for the device network configuration method, as shown below.

First, the management frame (e. g., the detection request frame) transmitted by the first device is described.

```
Type:0x03
  DATA: SetupReq
  message SetupInfo {
    bytes apSSID = 1;
    bytes apKey = 2;
    bytes PMK = 3; // Pairwise Master Key
    uint32 shareChannel = 4;
    bytes vendorData = 5; // Vendor specific data
  }
  message SetupReq {
    message ECDH {
      // secp256r1 ECDH public key X9.62 non-compressed format
      bytes clientPubKey = 1;
      // random iv with 12 bytes
      bytes iv = 2;
      // encrypted network configuration information + CCM MAC
      // algorithm: AES-128-CCM
      // key = HKDF(prk=ECDH-SharedKey,salt=random,info="ht L2 setup"), 16 bytes
in length,
      // plaintext = data after SetupInfo is serialized
      // iv = iv field
      // additional_data = clientPubKey
      // tag is the MAC of 16 byte CCM
      bytes encData = 3;
    }
    message StateReq {
    }
    oneof reqType {
      // Encrypt SetupInfo with ecdh key exchange
      ECDH ecdh =1;
      StateReq stateReq = 2;
    }
  }
```

Next, the management frame (e.g., a probe response frame) transmitted by the second device is described.

```
Type:0x04
DATA: SetupResp
message SetupResp {
  enum Status {
    // Current progress cannot be determined or notification progress is not supported
    ProgressIsNotSupported = 0;
    // a configuration status has been received
    DeviceSetupReceived = 1;
    // Waiting for user interaction
    Device WaitingForUserInteractive = 1024;
    // The device is preparing networking components
    NetworkPreparing = 4096;
    // Searching and connecting to the network
    NetworkAssosciating = 5120;
    // Network authentication in progress
    Network Authencating = 6144;
    // Getting network address
    NetworkRequestingAddress = 7168;
    // Preparing to connect to the server
    ServerPreparing = 8192;
    // Connecting to server
    ServerConnecting = 9216;
    // Identity authentication
    ServerAuthencating = 10240;
    // Binding device to user
    ServerBindingUser = 11264;
    // Preparing to initialize the device after the device is connected to the cloud
    DevicePreparingInitialization = 12288;
    // Initialization progress code defined by the device itself
    DeviceSpecifiedInitializationProgressStart = 13312,
    reserved 13313 to 16383;
  }
  enum Result {
    OK = 0;
    // EC-JPAKE Continue
    // Detail should be filled the ecjpakeContinue field
    ECJPAKE_CONTINUE = 1;
    // Rejected by a user
    USER_INTERACTIVE_REJECT = 2;
    // Maximum configuration times are exceeded
```

```
    MAX_SETUP_EXCESSED = 3;
    // Encryption mode is not supported
    ENCRYPTION_NOT_SUPPORTED =4;
    // WIFI hotspot detection failed
    WIFI_PROBE_FAILED = 5;
    // WIFI authentication failed
    WIFI_AUTH_FAILED = 6;
    // WIFI other connection errors
    WIFI_OTHER_ERROR = 7;
    // Failed to get network address
    REQUEST_NETWORK_ADDRESS_FAILED=8;
    // The address of the server is unreachable (routing error, DNS parse failure, or
connection failure)
    SERVER_UNREACHABLE = 9;
    // Secure connection handshake failed
    // A server TLS connection failure does not terminate the entire server connection
process. When all server address attempts fail, if
    // There is a TLS connection error, SERVER_TLS_HANDSHAKE_FAILED is
used
    SERVER_TLS_HANDSHAKE_FAILED = 10;
    // The device binding was explicitly rejected by the server.
    // Detail should be filled serverRejectedCode
    SERVER_REJECTED = 11;
    // Server response timeout
    SERVER_TIMEOUT = 12;
    // Configuration failed because the device received unexpected data
    UNEXPECTED_SETUP_DATA =13;
  }
  oneof code {
    Status status = 1; // Configuration process
    Result result = 2; // Configuration Results
  }
  oneof detail {
    uint32 serverRejectedCode = 3; // Error code rejected by the server
  }
}
```

That the above embodiment introduces the device network configuration method provided by some embodiments of the present disclosure from a perspective of interaction between the first device and the second device. The above operations performed by the first device may be separately implemented as a device network configuration method on a first device side, and the above operations performed by the second device may be separately implemented as a device network configuration method on a second device side.

Following are apparatus embodiments of the present disclosure, which may be configured to perform the method embodiments of the present disclosure. Details not disclosed in the apparatus embodiments of the present disclosure, the method embodiments of the present disclosure may be referred.

Figure 9:
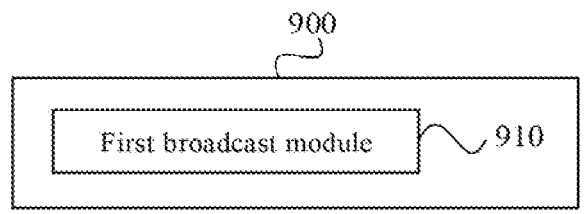
FIG. 9 is a block diagram of a device network configuration apparatus according to a first embodiment of the present disclosure.

As illustrated in FIG. 9, FIG. 9 is a block diagram of a device network configuration apparatus according to a first embodiment of the present disclosure. The apparatus has functions of implementing above the first device side method embodiments, and the functions may be implemented by a hardware or by executing a corresponding software by a hardware. The apparatus may be the first device 120 in the network configuration system illustrated in FIG. 1, or the apparatus may be arranged in the first device 120 in the network configuration system illustrated in FIG. 1. The first device interacts with the second device through n management frames. At least one of the n management frames includes a vendor specific field, and n is an integer greater than Q. As illustrated in FIG. 9, the apparatus 900 may include a first broadcast module 910.

The first broadcast module 910 is configured to broadcast the first management frame, the vendor specific field of the first management frame carries networking information of the first network, and the networking information of the first network is used to configure the second device to access the first network.

In some embodiments, the first broadcast module 910 is configured to broadcast the first management frame on the operating channel of the second device.

In some embodiments, the vendor specific field includes at least one IE, and the first IE in the at least one IE includes at least one of following sub-fields: the tag number sub-field used to identify the vendor specific field, the length sub-field used to identify the length of the first IE, the OUI sub-field used to identify the format standard corresponding to the first IE, the type sub-field used to identify the type of the layer-2 message, the data sub-field used to describe content information of the layer-2 message.

In some embodiments, the layer-2 message carried by the first management frame includes the device network configuration request. The value of the type sub-field corresponding to the device network configuration request is the first value. The data sub-field corresponding to the device network configuration request carries the networking information of the first network.

Figure 10:
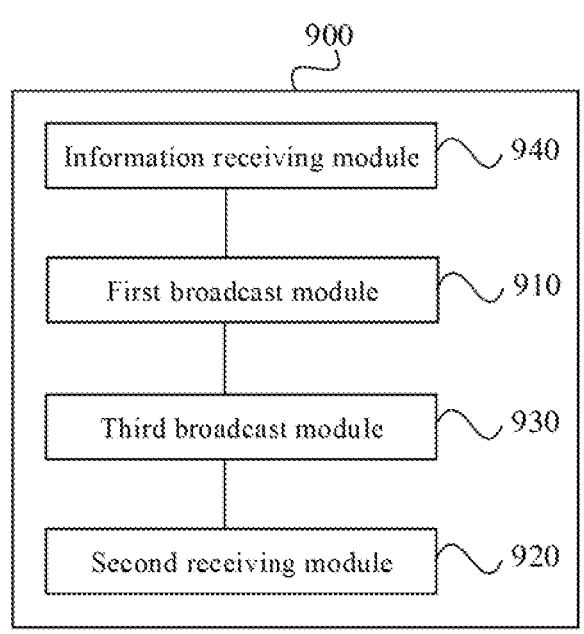
FIG. 10 is a block diagram of a device network configuration apparatus according to a second embodiment of the present disclosure.

In some embodiments, as illustrated in FIG. 10, the apparatus 900 may also include a second receiving module 920 configured to receive the second management frame from the second device, and the vendor specific field of the second management frame carries network-configuration-progress information of the second device.

In some embodiments, the layer-2 message carried by the second management frame includes the device network configuration response. The value of the type sub-field corresponding to the device network configuration response is the second value. The data sub-field corresponding to the device network configuration response carries the network-configuration-progress information.

In some embodiments, as illustrated in FIG. 10, the apparatus 900 may also include a third broadcast module 930 configured to broadcast the third management frame on the channel corresponding to the first network, and the vendor specific field of the third management frame carries network-configuration-progress-query information for the second device.

In some embodiments, the layer-2 message carried by the third management frame includes the device network configuration request. The value of the type sub-field corresponding to the device network configuration request is the first value. The data sub-field corresponding to the device network configuration request carries the network-configuration-progress-query information.

In some embodiments, as illustrated in FIG. 10, the third broadcast module 930 is configured to broadcast the third management frame on the channel corresponding to the first network at the first interval from the broadcasting time of the first management frame.

In some embodiments, the first broadcast module 910 is also configured to broadcast the first management frame on the operating channel of the second device again. The second network is a network started by the second device.

In some embodiments, as illustrated in FIG. 10, the device 900 may also include an information receiving module 940 configured to acquire the device information of the second device, and the device information of the second device includes at least one of the operating channel of the second device, product identification information of the second device, the capability information of the second device, and a random number; the capability information of the second device includes that the second device supports the layer-2 network configuration; the random number is used to generate a shared key to encrypt the networking information of the first network.

In some embodiments, the first management frame also carries the random number used for the second device to perform the message verification.

In some embodiments, the type of the at least one management frame includes an action frame or a detection frame.

To sum up, the technical solutions provided by the embodiment of the present disclosure implements rapid interaction of information related to network configuration between the network configuration device and the intelligent device by the network configuration device broadcasting the information related to network configuration to the intelligent device. In some embodiments of the present disclosure, the network configuration device may broadcast the information related to the network configuration to the intelligent device without disconnecting the current communication connection, such that the stability of the current communication connection of the network configuration device is ensured. Moreover, in some embodiments of the present disclosure, the intelligent device only needs to monitor to acquire the information related to the network configuration without starting hotspot connection, such that there is no high requirement for the device capability of the intelligent device, thereby reducing the cost of the intelligent device.

Figure 11:
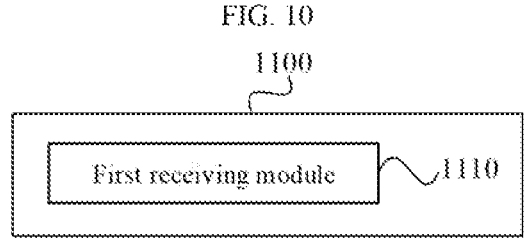
FIG. 11 is a block diagram of a device network configuration apparatus according to a third embodiment of the present disclosure.

As illustrated in FIG. 11, FIG. 10 is a block diagram of a device network configuration apparatus according to a second embodiment of the present disclosure. The apparatus has functions of implementing the above the second device side methods, and the functions may be implemented by a hardware or by executing a corresponding software by a hardware. The apparatus may be the second device 110 in the network configuration system illustrated in FIG. 1, or it may be arranged in the second device 110 in the network configuration system illustrated in FIG. 1. The second device interacts with the first device through n management frames. At least one of the n management frames includes a vendor specific field, and the n is an integer greater than 0. As illustrated in FIG. 11, the apparatus 1100 may include a first receiving module 1110.

The first receiving module 1110 is configured to receive the first management frame from the first device. The vendor specific field of the first management frame carries the networking information of the first network. The networking information of the first network is used to configure the second device to access the first network.

In some embodiments, the first receiving module 1110 is configured to monitor the first management frame on the operating channel of the second device.

In some embodiments, the vendor specific field includes at least one IE, and the first IE in the at least one IE includes at least one of following sub-fields: the tag number sub-field used to identify the vendor specific field, the length sub-field used to identify the length of the first IE, the OUI sub-field used to identify the format standard corresponding to the first IE, the type sub-field used to identify the type of the layer-2 message, the data sub-field used to describe content information of the layer-2 message.

In some embodiments, the layer-2 message carried by the first management frame includes the device network configuration request. The value of the type sub-field corresponding to the device network configuration request is the first value. The data sub-field corresponding to the device network configuration request carries the networking information of the first network.

Figure 12:
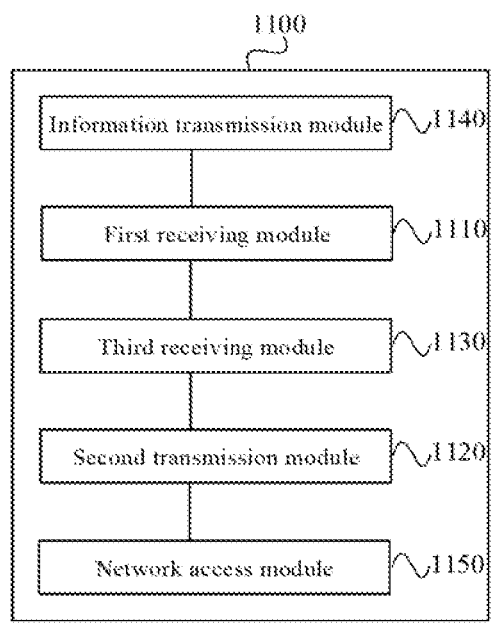
FIG. 12 is a block diagram of a device network configuration apparatus according to a fourth embodiment of the present disclosure.

In some embodiments, as illustrated in FIG. 12, the apparatus 1100 may also include a second transmission module 1120 configured to transmit the second management frame to the first device, and the vendor specific field of the second management frame carries the network-configuration-progress information of the second device.

In some embodiments, the layer-2 message carried by the second management frame includes the device network configuration response. The value of the type sub-field corresponding to the device network configuration response is the second value. The data sub-field corresponding to the device network configuration response carries the network-configuration-progress information.

In some embodiments, as illustrated in FIG. 12, the second transmission module 1120 is configured to transmit the second management frame to the first device in response to the network configuration progress for the second device meets the first condition. The first condition includes any of the following: within a second interval in a process of a network configuration, within the second interval after the network configuration is successful, and within the second interval after the network configuration is failed.

In some embodiments, as illustrated in FIG. 12, the apparatus 1100 may also include a third receiving module 1130 configured to receive the third management frame broadcast by the first device on the channel corresponding to the first network, and the vendor specific field of the third management frame carries the network-configuration-progress-query information for the second device.

In some embodiments, the layer-2 message carried by the third management frame includes the device network configuration request. The value of the type sub-field corresponding to the device network configuration request is the first value. The data sub-field corresponding to the device network configuration request carries the network-configuration-progress-query information.

In some embodiments, as illustrated in FIG. 12, the apparatus 1100 may also include an information transmission module 1140 configured to transmit the device information of the second device to the first device, and the device information of the second device includes at least one of the operating channel of the second device, the product identification information of the second device, the capability information of the second device, and the random number. The capability information of the second device includes that the second device supports the layer-2 network configuration. The random number is used to generate a shared key to encrypt the networking information of the first network.

In some embodiments, the first management frame also carries the random number used for the second device to perform the message verification.

In some embodiments, the type of the at least one management frame includes an action frame or a detection frame.

In some embodiments, as illustrated in FIG. 12, the apparatus may 1100 also include a network access module 1150 configured to acquire the signal strength corresponding to the first device, and access the first network based on the networking information of the first network when the signal strength meets the second condition. In some embodiments, the network access module 1150 is configured to acquire the signal strength corresponding to the first device, determine the distance between the first device and the second device based on the signal strength, and access the first network based on the networking information of the first network when the distance meets the third condition. In some embodiments, the network access module 1150 is configured to acquire the distance between the first device and the second device, and access the first network based on the networking information of the first network when the distance meets the third condition.

In some embodiments, the second condition includes that the signal strength is greater than the first strength threshold, and the third condition includes that the distance is less than the first distance threshold.

To sum up, the technical solutions provided by the embodiment of the present disclosure implements rapid interaction of information related to network configuration between the network configuration device and the intelligent device by the network configuration device broadcasting the information related to network configuration to the intelligent device. In some embodiments of the present disclosure, the network configuration device may broadcast the information related to the network configuration to the intelligent device without disconnecting the current communication connection, such that the stability of the current communication connection of the network configuration device is ensured. Moreover, in some embodiments of the present disclosure, the intelligent device only needs to monitor to acquire the information related to the network configuration without starting hotspot connection, such that there is no high requirement for the device capability of the intelligent device, thereby reducing the cost of the intelligent device.

When the apparatuses provided by the above embodiment implements their functions, the above division of each functional module is taken as an example. In practical applications, the above functional allocation may be completed by different functional modules according to actual needs. that is, a content structure of the device is divided into different functional modules to complete all or part of the functions described above.

In the apparatus in the above embodiment, specific manners of each module to perform operation has been described in detail in some embodiment of the method, and will not be described in detail here.

Figure 13:
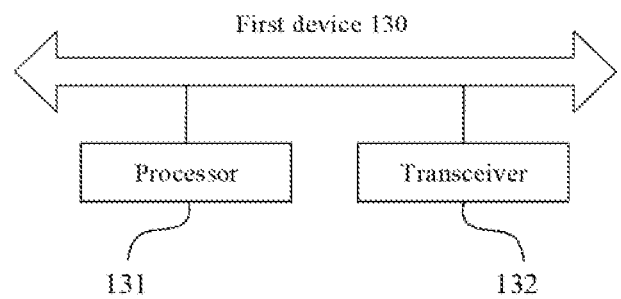
FIG. 13 is a block diagram of a first device according to an embodiment of the present disclosure.

As illustrated in FIG. 13, FIG. 13 is a block diagram of a first device 130 according to an embodiment of the present disclosure. For example, the first device 130 may be configured to implement the above device network configuration method on the first device side. Specifically, the first device 130 may include a processor 131 and a transceiver 132 connected to the processor 131.

The processor 131 includes one or more processing cores. The processor 131 executes various functional applications and information processing by running software programs and modules.

The transceiver 132 includes a receiver and a transmitter. In some embodiments, the transceiver 132 is a communication chip.

In some embodiments, the first device 130 may also include a memory and a bus. The memory is connected to the processor via the bus. The memory may be configured to store a computer program, and the processor may be configured to execute the computer program to implement the operations performed by the first device in the above method embodiments.

In addition, the memory may be implemented by any type of a transitory storage device or a non-transitory storage device, or combination of the transitory storage device and the non-transitory storage device. The transitory or non-transitory storage devices include but are not limited to: a random access memory (RAM), a read only memory (ROM), an erasable programmable read only memory (EPROM), an electrically erasable programmable read only memory (EEPROM), a flash memory or other memories using a solid-state storage technology, a compact disc read only memory (CD-ROM), a digital video disc (DVD) or other optical storages, a tape cartridge, a tape, a disk storage or other magnetic storage apparatuses.

The transceiver 132 is configured to broadcast the first management frame, the vendor specific field of the first management frame carries networking information of the first network, and the networking information of the first network is used to configure the second device to access the first network.

In some embodiments, the transceiver 132 is configured to broadcast the first management frame on the operating channel of the second device.

In some embodiments, the vendor specific field includes at least one IE, and the first IE in the at least one IE includes at least one of following sub-fields: the tag number sub-field used to identify the vendor specific field, the length sub-field used to identify the length of the first IE, the OUI sub-field used to identify the format standard corresponding to the first IE, the type sub-field used to identify the type of the layer-2 message, the data sub-field used to describe content information of the layer-2 message.

In some embodiments, the layer-2 message carried by the first management frame includes the device network configuration request. The value of the type sub-field corresponding to the device network configuration request is the first value. The data sub-field corresponding to the device network configuration request carries the networking information of the first network.

In some embodiments, the transceiver 132 is configured to receive the second management frame from the second device, and the vendor specific field of the second management frame carries network-configuration-progress information of the second device.

In some embodiments, the layer-2 message carried by the second management frame includes the device network configuration response. The value of the type sub-field corresponding to the device network configuration response is the second value. The data sub-field corresponding to the device network configuration response carries the network-configuration-progress information.

In some embodiments, the transceiver 132 is configured to broadcast the third management frame on the channel corresponding to the first network, and the vendor specific field of the third management frame carries network-configuration-progress-query information for the second device.

In some embodiments, the layer-2 message carried by the third management frame includes the device network configuration request. The value of the type sub-field corresponding to the device network configuration request is the first value. The data sub-field corresponding to the device network configuration request carries the network-configuration-progress-query information.

In some embodiments, the transceiver 132 is configured to broadcast the third management frame on the channel corresponding to the first network at the first interval from the broadcasting time of the first management frame.

In some embodiments, the transceiver 132 is configured to broadcast the first management frame on the operating channel of the second device again. The second network is a network started by the second device.

In some embodiments, the transceiver 132 is configured to acquire the device information of the second device. The device information of the second device includes at least one of the operating channel of the second device, product identification information of the second device, the capability information of the second device, and the random number; the capability information of the second device includes that the second device supports the layer-2 network configuration; the random number is used to generate a shared key to encrypt the networking information of the first network.

In some embodiments, the first management frame also carries the random number used for the second device to perform the message verification.

In some embodiments, the type of the at least one management frame includes an action frame or a detection frame.

Figure 14:
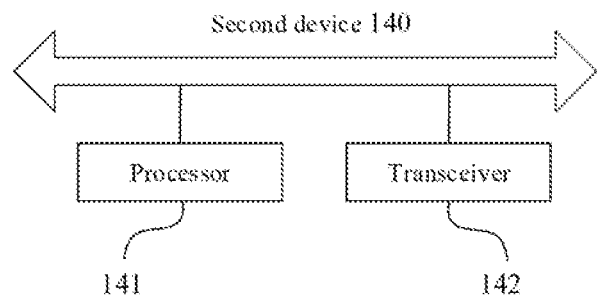
FIG. 14 is a block diagram of a second device according to an embodiment of the present disclosure.

As illustrated in FIG. 14, FIG. 14 is a block diagram of a second device 140 according to an embodiment of the present disclosure. For example, the second device 140 may be configured to perform the device network configuration method on the second device side. Specifically, the second device 140 may include a processor 141 and a transceiver 142 connected to the processor 141.

The processor 141 includes one or more processing cores. The processor 141 executes various functional applications and information processing by running software programs and modules.

The transceiver 142 includes a receiver and a transmitter. In some embodiments, the transceiver 142 is a communication chip.

n some embodiments, the second device 140 may also include a memory and a bus. The memory is connected to the processor via the bus. The memory may be configured to store a computer program, and the processor may be configured to execute the computer program to implement the operations performed by the second device in the above method embodiments.

In addition, the memory may be implemented by any type of a transitory storage device or a non-transitory storage device, or a combination of the transitory storage device or the non-transitory storage device. The transitory or non-transitory storage device include but are not limited to the following devices: a RAM and a ROM, an EPROM, an EEPROM, a flash memory or other memories using a solid-state storage technology, a CD-ROM, a DVD or other optical storages, a tape cartridge, a tape, a disk storage or other magnetic storage devices.

The transceiver 142 is configured to receive the first management frame from the first device. The vendor specific field of the first management frame carries the networking information of the first network. The networking information of the first network is used to configure the second device to access the first network.

In some embodiments, the transceiver 142 is configured to monitor the first management frame on the operating channel of the second device.

In some embodiments, the vendor specific field includes at least one IE, and the first IE in the at least one IE includes at least one of following sub-fields: the tag number sub-field used to identify the vendor specific field, the length sub-field used to identify the length of the first IE, the OUI sub-field used to identify the format standard corresponding to the first IE, the type sub-field used to identify the type of the layer-2 message, the data sub-field used to describe content information of the layer-2 message.

In some embodiments, the layer-2 message carried by the first management frame includes the device network configuration request. The value of the type sub-field corresponding to the device network configuration request is the first value. The data sub-field corresponding to the device network configuration request carries the networking information of the first network.

In some embodiments, the transceiver 142 is configured to transmit the second management frame to the first device, and the vendor specific field of the second management frame carries the network-configuration-progress information of the second device.

In some embodiments, the layer-2 message carried by the second management frame includes the device network configuration response. The value of the type sub-field corresponding to the device network configuration response is the second value. The data sub-field corresponding to the device network configuration response carries the network-configuration-progress information.

In some embodiments, the transceiver 142 is configured to transmit the second management frame to the first device in response to the network configuration progress for the second device meets the first condition. The first condition includes any of the following: within a second interval in a process of a network configuration, within the second interval after the network configuration is successful, and within the second interval after the network configuration is failed.

In some embodiments, the transceiver 142 is configured to receive the third management frame broadcast by the first device on the channel corresponding to the first network, and the vendor specific field of the third management frame carries the network-configuration-progress-query information for the second device.

In some embodiments, the layer-2 message carried by the third management frame includes the device network configuration request. The value of the type sub-field corresponding to the device network configuration request is the first value. The data sub-field corresponding to the device network configuration request carries the network-configuration-progress-query information.

In some embodiments, the transceiver 142 is configured to transmit the device information of the second device to the first device. The device information of the second device includes at least one of the operating channel of the second device, the product identification information of the second device, the capability information of the second device, and the random number. The capability information of the second device includes that the second device supports the layer-2 network configuration. The random number is used to generate a shared key to encrypt the networking information of the first network.

In some embodiments, the first management frame also carries the random number used for the second device to perform the message verification.

In some embodiments, the type of the at least one management frame includes an action frame or a detection frame.

In some embodiments, the processor 141 is configured to acquire the signal strength corresponding to the first device, and access the first network based on the networking information of the first network when the signal strength meets the second condition. In some embodiments, the processor 141 is configured to acquire the signal strength corresponding to the first device, determine the distance between the first device and the second device based on the signal strength, and access the first network based on the networking information of the first network when the distance meets the third condition. In some embodiments, the processor 141 is configured to acquire the distance between the first device and the second device, and access the first network based on the networking information of the first network when the distance meets the third condition.

In some embodiments, the second condition includes that the signal strength is greater than the first strength threshold, and the third condition includes that the distance is less than the first distance threshold.

In some embodiments, a computer-readable storage medium is also provided, and a computer program is stored in the computer-readable storage medium. The computer program is used to be executed by a processor of the first device to implement any one of the device network configuration methods of the first device.

In some embodiments, a computer-readable storage medium is also provided, and a computer program is stored in the computer-readable storage medium. The computer program is used to be executed by a processor of the second device to implement any one of the device network configuration methods of the second device.

In some embodiments, a chip is also provided. The chip includes a programmable logic circuit and/or program instructions. The chip runs on the first device to implement any one of the device network configuration methods on the first device side as described above.

In some embodiments, a chip is also provided. The chip includes a programmable logic circuit and/or program instructions. The chip runs on the second device to implement any one of the device network configuration methods on the second device side as described above.

In some embodiments, a computer program product is also provided. When the computer program product is executed by a processor of the first device, it is configured to implement any one of the device network configuration methods on the first device side.

In some embodiments, a computer program product is also provided. When the computer program product is executed by a processor of the second device, it is configured to implement any one of the device network configuration methods on the second device side.

Those skilled should understand that, in the above one or more examples, functions described in embodiments of the present disclosure may be implemented by a hardware, a software, a firmware or any combination thereof. When implemented by the software, the functions may be stored in a computer-readable medium or transmitted as one or more instructions or code on the computer-readable medium. The computer-readable medium includes a computer storage medium and a communication medium. The communication medium includes any medium that facilitates the transfer of computer programs from one place to another. The storage medium may be any available medium that may be stored and read by a general-purpose computer or a dedicated computer.

The above is only exemplary embodiments of the present disclosure, and is not intended to limit the present disclosure. Any modification, equivalent replacement, and improvement, etc. made within the spirit and principles of the present disclosure should be included in the protection scope of the present disclosure.

What is claimed is:

1. A device network configuration method, performed by a first device; the first device interacting with a second device through n management frames, at least one of the n management frames comprising a vendor specific field, and the n being an integer greater than 0; the method comprising:
broadcasting a first management frame without disconnecting a current communication connection, a vendor specific field of the first management frame carrying networking information of a first network, the networking information of the first network being configured to configure the second device to access the first network; and
broadcasting the first management frame on an operating channel of the second device again in response to a second network being detected, the second network being a network started by the second device.

2. The method as claimed in claim 1, wherein the broadcasting a first management frame comprises: broadcasting the first management frame on the operating channel of the second device; wherein the operating channel of the second device is acquired in a process of discovering the second device.

3. The method as claimed in claim 1, wherein before the broadcasting a first management frame, the method comprises:
displaying options corresponding to at least one network, wherein the at least one network including the first network, which is a network accessed by the first device.

4. The method as claimed in claim 2, wherein before a broadcasting the first management frame, the method comprises:
acquiring device information of the second device;
wherein the device information of the second device comprises at least one of the operating channel of the second device, product identification information of the second device, capability information of the second device, and a random number;
wherein the capability information of the second device comprises that the second device supports a layer-2 network configuration;

the random number is used to generate a shared key to encrypt the networking information of the first network.

5. The method as claimed in claim 4, wherein the first management frame carries the random number, and the random number is used for the second device to perform message verification.

6. The method as claimed in claim 1, wherein the vendor specific field comprises at least one information element, and a first information element in the at least one information element comprises at least one of:
a tag number sub-field, configured to identify the vendor specific field; a length sub-field, configured to identify a length of the first information element;
an organizationally unique identifier sub-field, configured to identify a format standard corresponding to the first information element;
a type sub-field, configured to identify a type of a layer-2 message; and
a data sub-field, configured to describe content information of the layer-2 message; or
wherein a layer-2 message carried by the first management frame comprises a device network configuration request; a value of a type sub-field corresponding to the device network configuration request is a first value; and a data sub-field corresponding to the device network configuration request carries the networking information of the first network; or
wherein a type of the at least one management frame comprises an action frame or a detection frame.

7. The method as claimed in claim 1, further comprising:
receiving a second management frame from the second device, a vendor specific field of the second management frame carrying network-configuration-progress information of the second device.

8. The method as claimed in claim 7, wherein
a layer-2 message carried by the second management frame comprises a device network configuration response;
a value of a type sub-field corresponding to the device network configuration response is a second value; and
a data sub-field corresponding to the device network configuration response carries the network-configuration-progress information.

9. The method as claimed in claim 7, wherein before the receiving a second management frame from the second device, the method comprises:
broadcasting a third management frame on a channel corresponding to the first network, a vendor specific field of the third management frame carrying network-configuration-progress-query information for the second device.

10. The method as claimed in claim 9, wherein
a layer-2 message carried by the third management frame comprises a device network configuration request;
a value of a type sub-field corresponding to the device network configuration request is a first value; and
a data sub-field corresponding to the device network configuration request carries the network-configuration-progress-query information.

11. The method as claimed in claim 9, wherein the broadcasting a third management frame on a channel corresponding to the first network comprises:
broadcasting the third management frame on the channel corresponding to the first network after a first interval from a broadcasting time of the first management frame.

12. A device network configuration method, performed by a second device; the second device interacting with a first device through n management frames, at least one of the n management frames comprising a vendor specific field, and the n being an integer greater than 0; the method comprising:
receiving a first management frame from the first device, a vendor specific field of the first management frame carrying networking information of the first network used to configure the second device to access the first network;
receiving the first management frame from the first device on an operating channel of the second device again; wherein the first management frame received again is broadcast by the first device in a case where the first device detects a second network, and the second network is a network started by the second device; and
performing frame filtering on the first management frame.

13. The method as claimed in claim 12, wherein the receiving a first management frame from the first device comprises:
monitoring the first management frame on the operating channel of the second device after entering a network configuration mode.

14. The method as claimed in claim 13, wherein before the receiving a first management frame from the first device, the method comprises:
transmitting device information of the second device to the first device, wherein the device information of the second device comprises at least one of the operating channel of the second device, product identification information of the second device, capability information of the second device, and a random number;
wherein the capability information of the second device comprises that the second device supports a layer-2 network configuration;
the random number is used to generate a shared key to encrypt the networking information of the first network;
wherein the first management frame carries the random number used for the second device to perform message verification;
wherein the performing frame filtering on the first management frame comprises:
performing frame filtering on the first management frame based on the random number.

15. The method as claimed in claim 12, wherein before the receiving a first management frame from the first device, the method comprises:
transmitting device information of the second device to the first device, wherein the device information of the second device comprises at least one of the operating channel of the second device, product identification information of the second device, capability information of the second device, and a random number;
wherein the capability information of the second device comprises that the second device supports a layer-2 network configuration;
the random number is used to generate a shared key to encrypt the networking information of the first network.

16. The method as claimed in claim 12, wherein the vendor specific field comprises at least one information element, and a first information element in the at least one information element comprises at least one of:
a tag number sub-field, configured to identify the vendor specific field;

a length sub-field, configured to identify a length of the first information element; an organizationally unique identifier sub-field, configured to identify a format standard corresponding to the first information element;

a type sub-field, configured to identify a type of a layer-2 message; and a data sub-field, configured to describe content information of the layer-2 message; or wherein a layer-2 message carried by the first management frame comprises a device network configuration request; a value of a type sub-field corresponding to the device network configuration request is a first value; and a data sub-field corresponding to the device network configuration request carries the networking information of the first network; or wherein a type of the at least one management frame comprises an action frame or a detection frame.

17. The method as claimed in claim 12, wherein after the receiving a first management frame from the first device, the method comprises:

acquiring a signal strength corresponding to the first device, and accessing first network based on the networking information of the first network in response to the signal strength meeting a second condition; or acquiring the signal strength corresponding to the first device, determining a distance between the first device and the second device based on the signal strength, and accessing first network based on the networking information of the first network in response to the distance meeting a third condition; or acquiring the distance between the first device and the second device, and accessing first network based on the networking information of the first network in response to the distance meeting the third condition.

18. The method as claimed in claim 17, wherein the second condition comprises that the signal strength is greater than a first strength threshold, and the third condition comprises that the distance is less than a first distance threshold.

19. A first device, interacting with a second device through n management frames, at least one of the n management frames comprising a vendor specific field, and the n being an integer greater than 0; the first device comprising:

a processor;

a transceiver, connected to the processor;

wherein the transceiver is configured to broadcast a first management frame without disconnecting a current communication connection, and a vendor specific field of the first management frame carries networking information of the first network used to configure the second device to access the first network;

the transceiver is configured to broadcast the first management frame on an operating channel of the second device again in response to a second network being detected, the second network is a network started by the second device.

* * * * *